Dec. 29, 1970        A. L. ROSSOFF        3,551,848

LASER MODULATING SYSTEM

Filed June 30, 1966        2 Sheets-Sheet 1

INVENTOR
ARTHUR L. ROSSOFF

BY
ATTORNEY

INVENTOR
ARTHUR L. ROSSOFF
ATTORNEY

United States Patent Office 3,551,848
Patented Dec. 29, 1970

3,551,848
LASER MODULATING SYSTEM
Arthur L. Rossoff, Huntington Station, N.Y., assignor to General Instrument Corporation, Newark, N.J., a corporation of New Jersey
Filed June 30, 1966, Ser. No. 561,778
Int. Cl. H01s 3/10
U.S. Cl. 332—7.51                        3 Claims

ABSTRACT OF THE DISCLOSURE

Two diodes, at least one of which is a laser diode, are connected in parallel and in oppositely poled relationship, the thus-defined network being connected in series with a resonant circuit, thereby producing a modulated light output.

---

The present invention relates to an improved system for microwave modulation of diode lasers.

One way of using laser beams for communication purposes is to produce a laser beam and impress upon that beam a modulation corresponding to the intelligence which it is desired to communicate. In order to cause a diode laser to emit a laser beam a threshold current must first be applied. Thereafter variation in the amount of current applied, above the threshold value, will result in an essentially linear corresponding variation in light output, thus producing the desired light modulation. For diode lasers presently available, the current-modulation properties of which are well recognized, the threshold currents are quite high, on the order of 10–100 amperes. Currents of this magnitude, when they pass through the diode laser, produce a very large amount of heat, thus raising the temperature of the laser. Diode lasers have a quite high positive temperature coefficient for threshold current, and as their temperature increases the value of threshold current necessary to maintain lasing rises, and may continue to rise until eventually the required threshold value exceeds the value of applied current, causing lasing to cease.

Therefore, except under conditions where very effective high capacity cooling systems are available, laser operation is conducted in short pulses, typically 50 nanoseconds in length, thereby to limit the degree of heat produced and consequently to maintain the temperature of the diode laser at a value such that its threshold current value remains within practical limits.

Within each of these short lasing pulses, the energization current must be modulated for intelligence communication purposes. Such modulations are typically at a frequency on the order of 1 gHz., and with an amplitude perhaps on the order of magnitude of 10 amperes.

While electronic circuitry capable of producing appropriate current pulses with appropriate modulation and at an appropriate pulse frequency is not impossible to design, such circuitry is necessarily formidable.

Theoretically one might attempt to energize the laser diode directly with a pulse of alternating current oscillating at the desired modulation frequency. Here again the circuitry needed to produce a radio frequency current having the appropriate amplitude would be quite difficult. Two additional problems also present themselves —since the laser is a diode it presents a non-linear impedance to the radio frequency input signal, and this greatly adds to circuit problems. Moreover, the application of a radio frequency source to the diode would result in the application to the diode, on each alternate half cycle, of an inverse voltage far above the breakdown voltage of the diode, thus leading to destruction of the diode.

The prime object of the present invention is to provide means by which direct radio frequency laser diode energization can be accomplished in a practical and effective manner.

More specifically, it is an object of the present invention to provide means for radio frequency actuation and modulation of a diode laser while presenting to the radio frequency signal source an impedance which is essentially linear and while preventing the application to the diode of any potentially destructive inverse voltage.

To these ends I employ a pair of diodes at least one of which is a laser diode, connected in parallel in oppositely poled relationship, and the thus-defined network is connected to an appropriate radio frequency source, preferably producing pulsed radio frequency signals. Because of the oppositely poled relationship of the two diodes, each will conduct on alternate half cycles of the radio frequency input signal, thus producing a substantially linear impedance characteristic to the network. Each of the diodes will, during those half cycles when they are non-conductive, be connected across the terminals of a conducting diode, and hence no destructive inverse voltage will be applied to the non-conducting diode. It is entirely feasible, and it is indeed preferred, for both of the diodes to be of the laser diode type, thus producing a pair of light sources, each coherent in and of itself although not coherent with respect to one another, which sources are modulated together and at the same frequency. The light beams produced from each diode laser, when two are employed, may be combined, the modulation of the combined beam then being twice the frequency of modulation of an individual beam, or they may be used separately or selectively.

It is preferred, in order to reduce the current requirements for the radio frequency signal source while at the same time satisfying the current requirements of the laser diode, that the laser diode or diodes be connected in a circuit resonant at the modulation radio frequency. That circuit, as here specifically disclosed, is defined by an appropriately designed resonant cavity. In that way a high voltage, low current signal source may be employed, while still providing sufficient current to the diode laser to cause lasing to occur.

To the accomplishment of the above, and to such other objects as may hereinafter appear, the present invention relates to the arrangement of a modulated laser system as defined in the appended claims and as described in this specification, taken together with the accompanying drawings, in which:

Figure 2:
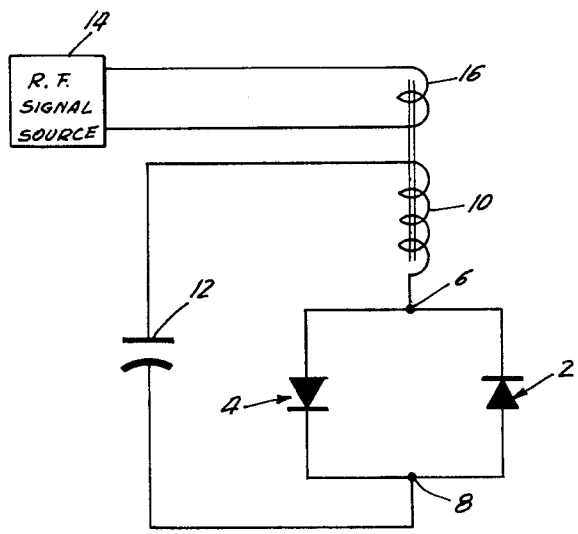
FIG. 2 is an exemplary circuit diagram.

In accordance with the teachings of the present invention, and as shown diagramatically in FIG. 2, a pair of diodes 2 and 4 are employed, at least one and preferably both of which constitute laser diodes, such as those made from gallium arsenide. They are connected in parallel, and in oppositely poled orientation, between network terminals 6 and 8. Connected across the terminals 6 and 8 is a circuit comprising inductance 10 and capacitance 12 connected in series with one another, Radio frequency signals from a signal source 14, which signals fluctuate at a predetermined modulation frequency which may be on the order of 1 gHz., are introduced into the prevously described network in any appropriate manner. In FIG. 2 the radio frequency signal source 14 energizes a primary coil 16 which is inductively associated with the inductance 10. The parameter of the inductance 10 and the capacitor 12 are so chosen that the circuit will be resonant at the frequency of oscillation of the signals from the source 14.

Figure 1:
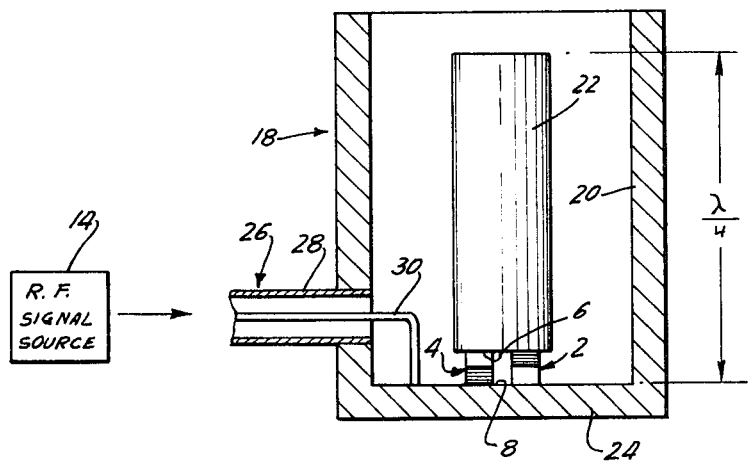
FIG. 1 is a semi-schematic cross sectional view of a preferred embodiment of the present invention.

In the physical embodiment somewhat schematically indicated in FIG. 1, the resonant circuit corresponding to the inductance 10 and capacitance 12 of FIG. 2 is defined by a resonant cavity generally designated 18 and comprising an outer conductor 20 and an inner conductor 22 electrically connected together at one end by conductive wall 24, the effective length of the cavity 18 being, as indicated, one quarter of the wave length of the radio frequence signal from source 14. The diodes 2 and 4 are connected between the shorting wall 24 and the lower end of the inner conductor 22 in parallel oppositely-poled relationship. The signal from the radio frequency source 14 is injected into the cavity 18 through the concentric line generally designated 26, the outer conductor 28 of which makes electrical connection with the outer conductor 20 and the inner conductor 30 of which makes electrical connection with the inner conductor 22 via the shorting wall 24 and the diodes 2 and 4.

When the radio frequency signal from the source 14 is applied, that signal, on each alternate half cycle thereof, will cause the diodes 2 and 4 alternately to become conductive. If the current caused to pass through the diodes 2 and 4, or whichever one of those diodes may be a laser diode, exceeds the threshold current value thereof, sufficient population inversion in that diode will be caused so that, after a few cycles of energization, lasing will begin, and the light output from the diode 2, 4 will be proportional to the amplitude of the radio frequency signal 14. The frequency of oscillation of the signal from the radio frequency source 14 will be sufficiently high so that the population inversions in a given diode 2, 4 will not have time to decay excessively between alternate half cycles, and as a result, once lasing of a given diode 2, 4 has commenced, lasing will continue for as long as the radio frequency signal continues to be supplied.

Because of the temperature characteristics of laser diodes with respect to their threshold current requirements, the radio frequency signal from source 14 will preferably be provided in pulses of suitable length, in accordance with well known principles and as described above. The pulse frequency is, of course, independent of the fluctuation radio frequency of the signal from the source 14.

The light output from the diodes 2 and 4, or from either one of them in case both are not laser diodes, will occur in a direction perpendicular to the plane of FIG. 1, and the walls of the cavity 18 will be provided with one or more windows through which the light beams emanating from the appropriate diodes 2, 4 can escape from the cavity 18. The light from each diode 2 and 4 will be coherent, as is characteristic of laser beams, but the light from diode laser 2 will not necessarily be coherent with the light from diode laser 4. However, the light output from both of those diodes, if they are both laser diodes, will be modulated together and at the same frequency. The individual light beams from the diodes 2 and 4 may be used separately and individually, or they may be used together in a coaxial or coincident beam, through the use of appropriate optical arrangements.

Whether one or both of the diodes 2 and 4 are laser diodes, it is desirable that they each have substantially the same electrical characteristics, so that a balanced circuit will result.

The frequency of the signal source 14 must be sufficiently high so that the population inversion does not have time to relax or decay, between alternate half cycles, sufficiently to prevent lasing on the next half cycle. This lower limit will vary with the characteristics of the individual laser diodes 2 and 4. A minimum value on the order of 1 gHz. is effective.

Figure 4:
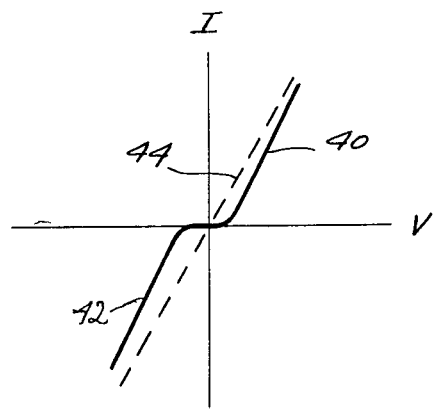
FIG. 4 is a graphical representation of the voltage-current characteristic of the interconnected laser diodes.

The voltage-current characteristics of the parallel-connected, oppositely poled laser diodes 2 and 4 is indicated in FIG. 4, line 40 representing the voltage-current characteristic of one of the diodes and the line 42 representing the corresponding characteristic of the other of the diodes. It will therefore be seen that the two diodes together exhibit a substantially linear voltage-current characteristic represented in idealized form by the broken line 44. The reciprocal slope of the line 44 represents the effective resistance R of the impedance presented by the diode lasers 2 and 4 as connected.

Figure 3:
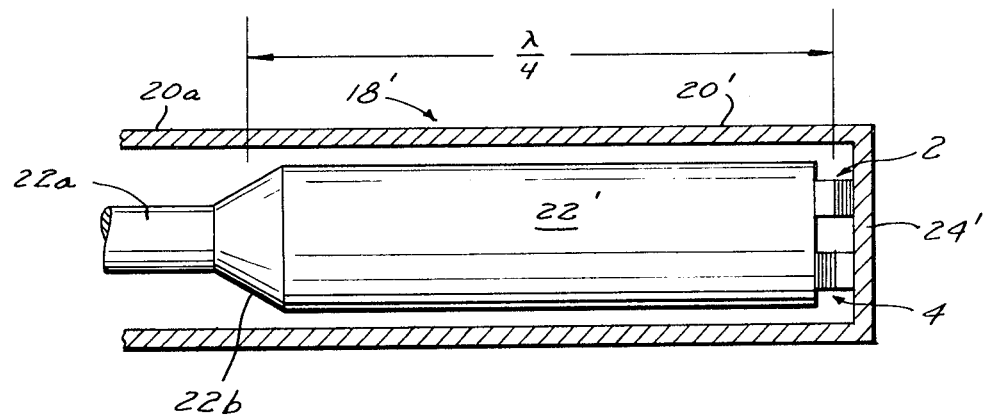
FIG. 3 is a view similar to FIG. 1 but of an alternative preferred embodiment.

FIG. 3 discloses another embodiment of the instant invention, in which the resonant cavity 18' is specifically shown in the form of a concentric line having an outer conductor 20' and an inner conductor 22', the line being shorted at one end by the wall 24' and the parallel-connected, oppositely poled laser diodes 2 and 4. The characteristic impedance of the thus-defined transmission line will be determined by the ratio between the diameters of the inner and outer conductive elements 22' and 20' respectively.

The resistance of the diode laser network, as indicated by the slope of the line 44 in FIG. 4, will usually be considerably lower than the usual impedance of the radio frequency signal source 14, that source usually having an input impedance of 50 ohms. This would produce an undesirable impedance mismatch. In order to avoid this mismatch, the outer and inner conductive elements 20' and 22' of the concentric line 18' are provided with axial extensions 20a and 22a respectively the ratio of the diameters of which are different from the corresponding ratio between the conductive elements 20' and 22'. It is convenient for the extension 20a of the outer conductive element 20' to be of the same diameter, while the extension 22a of the inner conductive element 22' is of a smaller diameter, and is connected to the element 22' by a tapered section 22b. The characteristic impedance of the concentric line defined by the conductive elements 20a and 22a is so chosen, by selecting the appropriate relative diameters of those elements, as to match or to correspond to the impedance of the radio frequency signal source 14. The relative diameters of the conductive elements 20' and 22' is preferably so chosen as to cause the characteristic impedance of the quarter-wave length concentric line or resonant cavity 18', to correspond to the following relationship: $Z_0' = (Z_0 R)^{1/2}$ where R is the effective resistance of the diode laser network 2, 4 (the reciprocal slope of the line 44 in FIG. 4), $Z_0$ is the characteristic impedance of the line defined by the extensions 20a, 22a, and $Z_0'$ is the characteristic impedance of the line 18'.

In this way the low load impedance R of the diodes 2, 4 is transformed to the desired impedance $Z_0$ of the radio frequency signal source 14, producing an effective impedance match.

Because of the resonant characteristics of the circuit in which the laser diodes 2, 4 are connectd at the oscillation frequency of the signal source 14, that source can have a high voltage-low current output signal which will nevertheless provide a high current, although at a reduced voltage, to the diodes 2 and 4, thereby permitting their threshold current requirements to be satisfied and also permitting their outputs to be modulated as desired. This, plus the fact that the load into which the radio frequency signal source 14 operates is substantially linear on alternate half cycles, greatly simplifies the design requirements for the signal source 14, and the use of a pulsed signal will not only bring the power output requirements from the signal source 14 to within a quite reasonable range, but will also prevent excessive temperature rise in the diode lasers 2 and 4 and hence will keep their threshold current requirements at practical values. By connecting the diodes 2 and 4 in parallel and in oppositely poled relationship, not only is a substantially linear impedance presented to the signal source 14, but the cavity 18 or the circuit 10, 12 is enabled to resonate, and at the same time the application of excessively high inverse voltages to a given diode 2 or 4 during those half cycles of the radio frequency signal when they are not conductive is prevented.

While but a limited number of embodiments of the present invention have been here specifically disclosed, it will be apparent that many variations may be made therein, all within the scope of the instant invention as defined in the following claims.

I claim:

1. A modulated laser system comprising a pair of diodes connected in parallel with one another and in series with a circuit resonant at the desired modulated frequency, said diodes being oppositely poled and at least one of said diodes being a laser diode, and means for applying signals to said diodes and said circuit, said signals oscillating substantially at said modulation frequency, in which said resonant circuit comprises a resonant cavity having first and second aligned sections, said diodes being connected between said sections, in which said first and second aligned sections of said resonant cavity respectively comprise inner and outer sections connected to one another at one end, said diodes being connected between said end and said inner section, said cavity having window means in operative registration with said laser diode through which the light emitted by said diode can pass.

2. The system of claim 1, in which the diameters of said inner and outer sections of said resonant cavity are in a first ratio and are provided, at the end thereof opposite said one end, with inner and outer axial extensions respectively the diameters of which are in a second ratio different from said first ratio.

3. The system of claim 1, in which the diameters of said inner and outer sections of said resonant cavity are in a first ratio and are provided, at the end thereof opposite said one end, with inner and outer axial extensions respectively the diameters of which are in a second ratio different from said first ratio, said second ratio being such as to produce along said extensions a coaxial line having a given characteristic impedance $Z_o$, said diodes as connected producing a composite impedance having an effective resistance R and said first ratio being such as to produce in said cavity a characteristic impedance $Zo' = (Z_o R)^{1/2}$.

References Cited

UNITED STATES PATENTS

| | | | |
|---|---|---|---|
| 3,319,080 | 5/1967 | Cornely et al. | 307—311 |
| 3,351,410 | 11/1967 | Ashkin | 350—161 |
| 3,305,685 | 2/1967 | Wang | 332—7.51 |

OTHER REFERENCES

Haynes et al.: "RCA Technical Notes No. 611," March 1965, pp. 1–2, 307–311.

ROY LAKE, Primary Examiner

D. R. HOSTETTER, Assistant Examiner

U.S. Cl. X.R.

331—14.5; 332—31

UNITED STATES PATENT OFFICE
CERTIFICATE OF CORRECTION

Patent No. 3,551,848           Dated   December 29, 1970

Inventor(s)  Arthur L. Rossoff

It is certified that error appears in the above-identified patent and that said Letters Patent are hereby corrected as shown below:

In the heading to the printed specification, line 5, "corporation of New Jersey" should read -- corporation of Delaware --.

Signed and sealed this 4th day of May 1971.

(SEAL)
Attest:

EDWARD M. FLETCHER, JR.                    WILLIAM E. SCHUYLER,
Attesting Officer                          Commissioner of Paten